US011946363B2

(12) United States Patent
Cox et al.

(10) Patent No.: US 11,946,363 B2
(45) Date of Patent: Apr. 2, 2024

(54) CALCULATING ENERGY BASED NET PRESSURE AND CORRESPONDING DISCHARGE AREA OBSERVED DURING HYDRAULIC STIMULATION PROCESSES

(71) Applicant: Halliburton Energy Services, Inc., Houston, TX (US)

(72) Inventors: Casey Lee Cox, Midland, TX (US); Kenneth Lee Borgen, Midland, TX (US); Russell James Padalecki, Midland, TX (US); Nathan Taylor Crawford, Midland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 80 days.

(21) Appl. No.: 17/729,753

(22) Filed: Apr. 26, 2022

(65) Prior Publication Data
US 2022/0251942 A1    Aug. 11, 2022

Related U.S. Application Data

(62) Division of application No. 16/809,379, filed on Mar. 4, 2020, now Pat. No. 11,339,647.

(51) Int. Cl.
*E21B 43/26* (2006.01)
*E21B 47/06* (2012.01)
*E21B 47/08* (2012.01)
*E21B 47/10* (2012.01)
*G01V 20/00* (2024.01)

(52) U.S. Cl.
CPC .............. *E21B 47/10* (2013.01); *E21B 43/26* (2013.01); *E21B 47/06* (2013.01); *E21B 47/08* (2013.01); *G01V 20/00* (2024.01)

(58) Field of Classification Search
CPC ...... E21B 43/26; E21B 43/2607; E21B 43/27; E21B 47/06; E21B 47/08
See application file for complete search history.

(56) References Cited

U.S. PATENT DOCUMENTS

| 7,213,661 | B2 | 5/2007 | Larsen et al. |
| 8,154,419 | B2 | 4/2012 | Daussin et al. |
| 8,960,294 | B2 | 2/2015 | Freese et al. |

(Continued)

FOREIGN PATENT DOCUMENTS

| EP | 2229504 | 3/2012 |
| WO | 2018132106 | 7/2018 |

OTHER PUBLICATIONS

SPE 10911, Nolte, Amoco Production Co., Fracture Design Considerations based on Pressure Analysis, 1982.

(Continued)

*Primary Examiner* — Catherine Loikith
(74) *Attorney, Agent, or Firm* — Michael Jenney; C. Tumey Law Group PLLC

(57) ABSTRACT

A method for determining discharge area in hydraulic stimulation operations is provided that includes obtaining one or more treatment data inputs from a well system, and determining a discharge area by applying the one or more treatment data inputs to a function that determines discharge area in terms of volumetric flow rate of the fracturing fluid, wherein the discharge area is a total area of all downhole exits through which the fracturing fluid exits a wellbore into a subterranean formation.

20 Claims, 6 Drawing Sheets

(56) References Cited

U.S. PATENT DOCUMENTS

| | | |
|---|---|---|
| 9,678,239 B2 | 6/2017 | Habashy et al. |
| 9,891,152 B2 | 2/2018 | Guo et al. |
| 11,339,647 B2 * | 5/2022 | Cox .................... E21B 47/08 |
| 2016/0098502 A1 | 4/2016 | Havre et al. |
| 2019/0153303 A1 | 5/2019 | Riley et al. |
| 2019/0242230 A1 | 8/2019 | Graham et al. |
| 2019/0330975 A1 | 10/2019 | Martysevich et al. |

OTHER PUBLICATIONS

Lagrone, K. W., & Rasmussen, J. W. (1963). A New Development in Completion Methods—The Limited Entry Technique. Journal of Petroleum Technology, 15(07), 695-702.

SPE 106058, Massaras, et al., Enhanced Fracture Entry Friction Analysis of the Rate Step-Down Test, 2007.

Cramer, D. D. (1987). The Application of Limited-Entry Techniques in Massive Hydraulic Fracturing Treatments. SPE Production Operations Symposium. (F-3077).

Pinnacle, Fiber-Optic Sensing Technologies, For Well Monitoring to Reservoir Management, H09710, Sep. 2012.

Bazan Consulting, Inc., Applied Post-Job Analytics, 2020.

Lagrone, et al., A new development in completion methods—the limited entry technique, Well Completions, SPE-530-PA, Journal of Petroleum Technology, 1963.

Office Action Summary for U.S. Appl. No. 16/809,379 dated Sep. 15, 2021.

Notice of Allowance or U.S. Appl. No. 16/809,379 dated Feb. 7, 2022.

* cited by examiner

US 11,946,363 B2

CALCULATING ENERGY BASED NET PRESSURE AND CORRESPONDING DISCHARGE AREA OBSERVED DURING HYDRAULIC STIMULATION PROCESSES

BACKGROUND

The present application is a divisional of U.S. patent application Ser. No. 16/809,379, filed on Mar. 4, 2020, the entire disclosure of which is incorporated herein by reference.

Hydrocarbon-producing wells are stimulated by hydraulic stimulation operations to increase the formation surface area exposed to the wellbore to enhance hydrocarbon recovery rates. Determination of pressure response during and after fracturing may be used to interpret the fracturing process and revise the configuration of subsequent treatments or a treatment in progress. In some cases, pressure response resulting from hydraulic stimulation may be interpreted to provide operational insights to inform decisions.

Though some principles are similar across hydraulic operations, each application is unique and requires the collection of data and the participation of experienced personnel to optimize efficiency of the operation. Present approaches to determine the net pressure energy and discharge area observed during hydraulic stimulation operations often do not adequately address areas of uncertainty including the delineation between formation pressure responses, near-wellbore tortuosity, and wellbore storage capacity.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may relate to hydraulic stimulation operations, and, in one or more implementations, to hydraulic stimulation methods including performing real-time pressure and energy analysis. The present disclosure describes a technique to determine hydraulic stimulation diagnostic data during hydraulic stimulation processes. The present disclosure makes use of algorithms including use of equations of conservation of mass and energy to determine a discreet solution for the hydraulic stimulation diagnostic data outputs, such as discharge area, discharge velocity, net pressure energy, and discharge energy, among others. By assuming the downhole fracturing environment is a closed system, these equations of conservation of mass and energy may be solved from initial conditions to final conditions through the relationships of kinetic and potential energy of compressed fluids to obtain the hydraulic diagnostic data outputs. The techniques may be used to determine the hydraulic diagnostic data outputs in real time. Equations and derivations are provided by way of illustration to set forth the novel system and methods. It will be appreciated that the equations are presented using physical dimensions for use when applying any system or systems of units.

Figure 1:
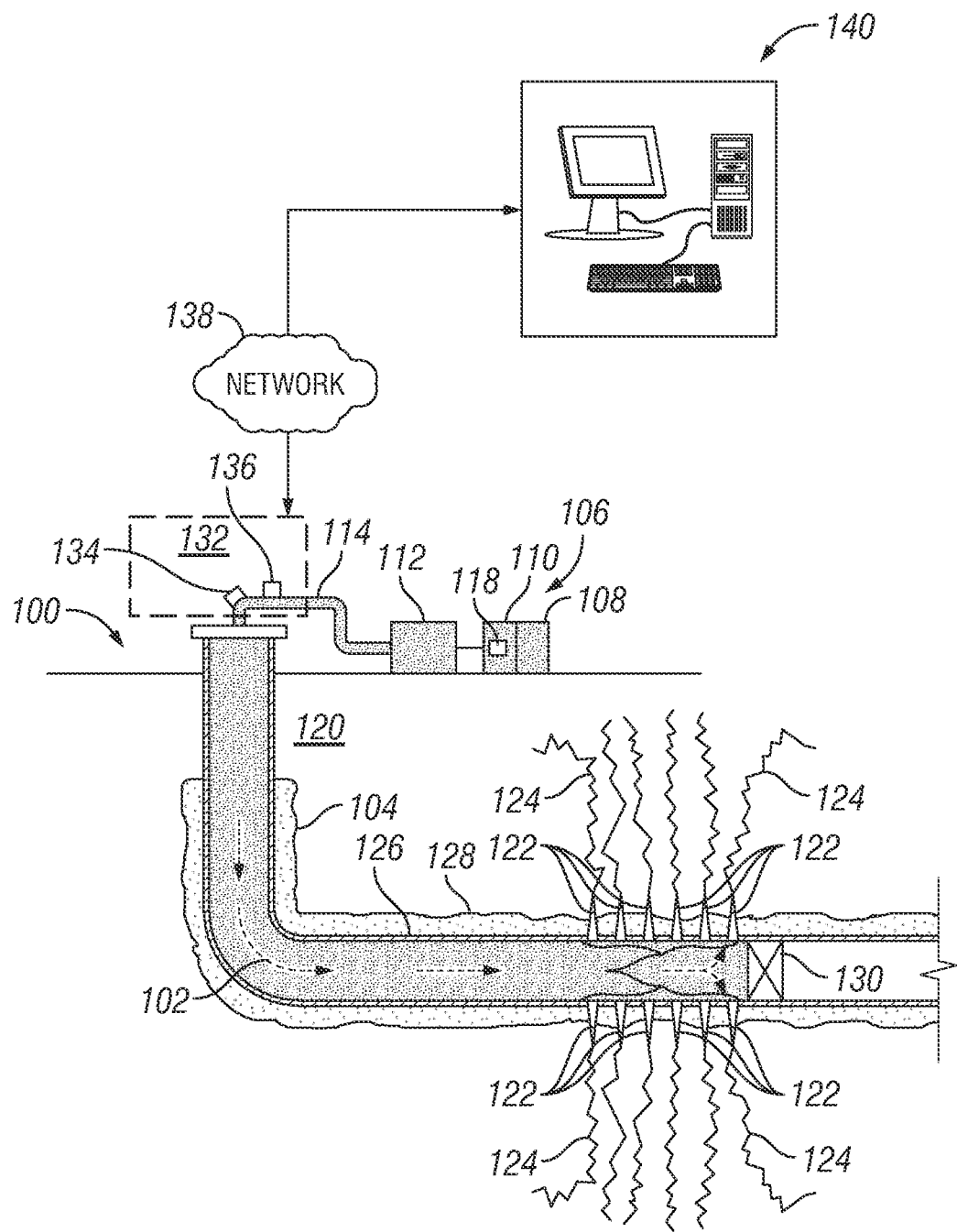
FIG. 1 is a schematic view of an example well system utilized for hydraulic stimulation including an information handling system.

FIG. 1 illustrates an example of a well system 100 that may be used to introduce hydraulic stimulation fluid 102 into a subterranean formation 120 surrounding a wellbore 104. Well system 100 may include a fluid handling system 106, which may include fluid supply 108, mixing equipment 110, pumping equipment 112, and wellbore supply conduit 114. Pumping equipment 112 may be fluidly coupled with the fluid supply 108 and wellbore supply conduit 114 to communicate a fracturing fluid 102 into wellbore 104. Fracturing fluid 102 may include a proppant 118 introduced via mixing equipment 110. The fluid supply 108 and pumping equipment 112 may be above the surface while wellbore 104 is below the surface.

Treatment attributes such as pressure, density, and rate may be monitored during operation of the well system. For example, well system 100 may be used for the pumping of a pad or pre-pad fluid into the subterranean formation 120 into one or more perforations 122 at a pumping rate and pressure at or above the fracture gradient of the subterranean formation to create and maintain at least one fracture 124 in subterranean formation 120. The pad or pre-pad fluid may be substantially free of solid particles such as proppant, for example, less than 1 wt. % by weight of the pad or pre-pad fluid. Well system 100 may then pump the fracturing fluid 102 into subterranean formation 120 surrounding the wellbore 104. Generally, a wellbore 104 may include horizontal, vertical, slanted, curved, and other types of wellbore geometries and orientations, and the fracturing fluid 102 may generally be applied to subterranean formation 120 surrounding any portion of wellbore 104, including fractures 124. The wellbore 104 may include the casing 126 that may be cemented (or otherwise secured) to the wall of the wellbore 104 by cement sheath 128.

Perforations 122 may allow communication between the wellbore 104 and the subterranean formation 120. As illustrated, perforations 122 may penetrate casing 126 and cement sheath 128 allowing communication between interior of casing 126 and fractures 124. A plug 130, which may be any type of plug for oilfield applications (e.g., bridge plug), may be disposed in wellbore 104 below the perforations 122. In accordance with systems and/or methods of the present disclosure, a perforated interval of interest (depth interval of wellbore 104 including perforations 122) may be isolated with plug 130. A pad or pre-pad fluid may be pumped into the subterranean formation 120 at a pumping rate and pressure at or above the fracture gradient to create and maintain at least one fracture 124 in subterranean formation 120. Then, proppant 118 which may be mixed with an aqueous based fluid via mixing equipment 110, and added to fracturing fluid 102, may be pumped via pumping equipment 112 from fluid supply 108 down the interior of casing 126 and into subterranean formation 120 at or above a fracture gradient of the subterranean formation 120. Pumping the fracturing fluid 102 at or above the fracture gradient of the subterranean formation 120 may create (or enhance) at least one fracture (e.g., fractures 124) extending from the perforations 122 into the subterranean formation 120. Alternatively, the fracturing fluid 102 may be pumped down production tubing, coiled tubing, or a combination of coiled tubing and annulus between the coiled tubing and the casing 126.

While perforations 122 are depicted in FIG. 1, it should be noted that the present disclosure is not limited to perforations and includes openings and fluid outlets in which hydraulic fluid may exit the wellbore. Such fluid outlets may include one or more slots or other any number of other shape configurations.

Treatment data may be logged during operation whereby at least a portion of the fracturing fluid 102 may enter the fractures 124 of subterranean formation 120 surrounding wellbore 104 by way of perforations 122. Perforations 122 may extend from the interior of casing 126, through cement sheath 128, and into subterranean formation 120. Treatment data attributes, such as pressure, density, and flow rate may be measured by instrumentation 132 in communication with well system 100. As shown, instrumentation 132 is coupled to fluid conduit 114 to log one or more treatment data attributes. Instrumentation 132 may include one or more densometers 134, one or more transducers 136, as well as other sensor devices. It should be noted that instrumentation 132 including densometer 134 and transducer 136 are illustrated diagrammatically and are not limited to the positions shown in FIG. 1.

Density measurements in the well system 100 may be made using any kind of densometer 134. For example, gravitic density meters, Coriolis density meters, nuclear density meters, microwave density meters, ultrasonic density meters, or any combination thereof. Alternatively, density may be calculated using refractive index measurements. As one of ordinary skill in the art will appreciate, a density of a solution will increase with increasing concentration of dissolved solids. A pressure transducer 136 may be coupled to the well system 100, headers, risers, or other equipment fluidically coupled to the wellbore 104 that may allow a pressure at the surface to be monitored. The wellhead pressure response may provide a measurement of the effectiveness of the friction reducing polymer at reducing friction in a conduit. Performance of a friction reducing polymer may also be monitored in a flow loop where a fluid including the friction reducing polymer is circulated continuously in a loop, passing through a measurement section. Pressure response of the fluid may be measured in the measurement section as the composition of the fluid is varied. Additional treatment attributes may include conductivity measurements, which may be made using instrumentation 132 such as a conductivity probe or multi meter. The conductivity probe may be of any type, for example, potentiometric type or inductive type.

FIG. 1 additionally illustrates an example of an information handling system 140 which may be in communication with one or more components of well system 100 such as instrumentation 132 and fluid handling system 106 via a network 138. The information handling system 140 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 140 may be a personal computer, a network storage device, or any other suitable device and may vary in size, shape, performance, functionality, and price.

Accordingly, various treatment data may be measured and collected at well system 100 during hydraulic stimulation operations. The treatment data may include, but is not limited to, volumetric flow rate (e.g., of the fracturing fluid 102), fluid pressure at the wellhead, surface sand concentration, density (e.g., of the fracturing fluid 102). The treatment data may also include various attributes of the well configuration, such as pipe diameter (e.g., inner diameter), depth of perforations 122, and friction profile, among others. From this treatment data, hydraulic stimulation diagnostic outputs may be calculated. As will be discussed in more detail below, the disclosed techniques utilize equations of conservation of mass and energy to determine the hydraulic stimulation diagnostic data outputs. By assuming the downhole environment is a closed system, these equations of conservation of mass and energy may be solved from initial conditions to final conditions through the relationships of kinetic and potential energy of compressed fluids to obtain the hydraulic diagnostic data outputs. The downhole environment can include induced fractures, natural fractures, formations, and the like.

The hydraulic diagnostic data outputs may include parameters such as discharge area, discharge energy, net pressure energy, and exit velocity. The term "discharge area" is defined as the total area of all downhole exits (e.g., perforations 122 or other openings) through which the fluid (e.g., pad fluid, fracturing fluid 102, etc.) is exiting the wellbore 104. The term "discrete discharge area" is defined as the area of a discrete opening through which the fluid exits the wellbore. The term "discharge energy" is defined as the pressure energy of the fluid (e.g., pad fluid, fracturing fluid 102, etc.) as it exits the wellbore 112. The term "net pressure energy" refers to the differential of the discharge energy at a point in time and the initial formation energy of the downhole environment. The "initial formation energy" is defined as the initial formation pressure at the wellbore exit. The "exit velocity" is defined as the velocity of the fluid as it exits the wellbore 112.

Figure 2:
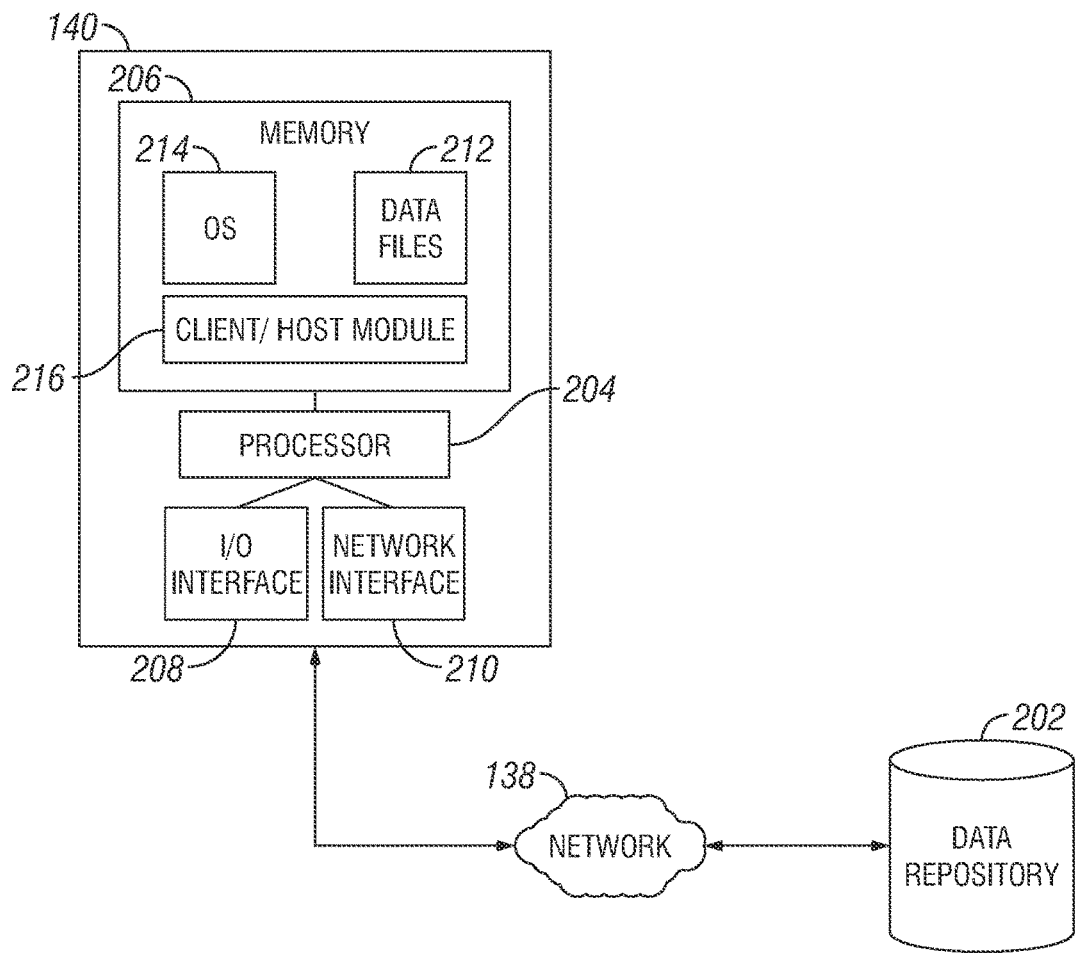
FIG. 2 illustrates an example of the information handling system.

FIG. 2 shows a view of the information handling system 140 introduced in FIG. 1. While single information handling system 140 is shown, it should be understood that the information handling system 140 may include multiple information handling systems as desired for a particular application. As shown, information handling system 140 is shown in communication over network 138. Information handling system 140 may be a standalone or integrated device such as a smart phone, tablet, PC, server, set top box, receiver, digital video recorder, streaming video player, console, and the like. Information handling system 140 may also include display devices such as a monitor featuring an operating system, media browser, and the ability to run one or more software applications.

As shown information handling system 140 is attached to a data repository 202. Data repository 202 may include one or more databases and information sources. Information handling system 140 may transmit information to or from data repository 202 for distribution over network 138 other network connected devices (not shown). In an example embodiment, information handling system 140 may process and provide information from data repository 202 for wellbore information including depths, type, wellbore configuration, sand concentrations, subterranean conditions, and hydraulic fluid composition attributes. Information handling system 140 may include a graphics library associated with providing design information associated with layout, fonts, colors, and the like that are associated with an information interface. Information handling system 140 may comprise a computing device as described herein. Consistent with embodiments of the disclosure, information handling system 140 may comprise one or more software applications (i.e., a series of instructions configured for execution by a processing unit) associated with another component, such as one or more servers or dedicated content devices.

Network 138 (also referred herein as distribution network or communication network) is, generally, used and implemented by a service provider (such as, but not limited to, a wired and/or wireless communication service provider). Network 138 additionally refers to infrastructure, including apparatuses and methods, operative and utilized to communicate data and/or signals between information handling system 140 and other networked devices. Similarly, for example and not limitation, network 138 may include current and future wired and/or wireless communication infrastructure for communicating data and/or signals with other communication networks, such as the internet. Network 138 may take one or more forms, or a combination thereof Network 138 may also allow for real-time, off-line, and/or batch transactions to be transmitted between or among information handling system 140 and one or more networked devices, such as data repository 202. Due to network connectivity, various methodologies as described herein may be practiced in the context of distributed computing environments.

Although information handling system 140 is shown for simplicity in an example embodiment as being in communication with data repository 202 via one intervening network 138, it is to be understood that other network configurations may be used. For example, intervening network 138 may include a plurality of networks, each with devices such as gateways and routers for providing connectivity between or among networks. Instead of, or in addition to network 138, dedicated communication links may be used to connect the various devices in accordance with example embodiments of the disclosure.

Information handling system 140 may be any processor-driven device, such as, but not limited to, a personal computer, laptop computer, smartphone, tablet, handheld computer, dedicated processing device, and/or an array of computing devices. In addition to having processor 204, server 102 and networked devices 106A-D may further include memory 206, input/output ("I/O") interface(s) 208, and network interface 210. Memory 206 may be any computer-readable medium, coupled to the processor, such as RAM, ROM, and/or a removable storage device for storing data files 212 and a database management system ("DBMS") to facilitate management of data files 212 and other data stored in memory 206 and/or stored in separate databases. Memory 206 may store data files 212 and various program modules, such as operating system ("OS") 214 and client module 216. OS 214 may be, but is not limited to, Microsoft Windows®, Apple OSX®, Apple iOS®, Apple iPadOS®, Unix, Oracle Java®, Linux, Android, or a mainframe operating system. Client module 216 may be an internet browser or other software, including a dedicated program, for interacting with information handling system 140.

Suitable processors, such as processors 204 of information handling system 140, may comprise any processor including but not limited to a microprocessor, RISC, ARM, ASIC, and/or a state machine. Example processors may include those provided by Intel Corporation, AMD Corporation, ARM Holdings, IBM, Qualcomm, Nvidia, Broadcom, Samsung, Marvell, TSMC, Apple, Texas Instruments, and Motorola Corporation. Such processors comprise, or may be in communication with media, for example computer-readable media, which stores instructions that, when executed by the processor, cause the processor to perform the elements described herein.

When needed, data or information stored in a memory or database may be transmitted to a database, such as information repository 202, capable of receiving data, information, or data records from more than one database or other data storage devices. In other embodiments, the databases shown may be integrated or distributed into any number of databases or other data storage devices. As used herein, the term "computer-readable medium" may describe any form of memory or a propagated signal transmission medium. Propagated signals representing data and computer program instructions may be transferred between network devices and systems. Embodiments of computer-readable media include, but are not limited to, electronic, flash, optical, solid state, magnetic, or other storage or transmission device capable of providing a processor with computer-readable instructions. Various other forms of computer-readable media may transmit or carry instructions to a computer, including a router, private or public network, or other transmission device or channel, both wired and wireless. The instructions may comprise code from any computer-programming language, including but not limited to, for example, basic, binary, machine code, C, C++, C#, objective-C, Cobol, HTML, Java, JavaScript, Lisp, Markdown, Pascal, Perl, PHP, Python, Ruby, SQL, Swift, Visual Basic, XML, and R.

Generally, network devices and systems, including information handling system 140 have hardware and/or software for transmitting and receiving data and/or computer-executable instructions over a communications link and a memory for storing data and/or computer-executable instructions. These network devices and systems may also include a processor for processing data and executing computer-executable instructions locally and over network 138, as well as other internal and peripheral components that are known in the art.

Still referring to information handling system 140, the I/O interface(s) 208 may facilitate communication between the processor 204 and various I/O devices, such as a keyboard, mouse, printer, microphone, speaker, monitor, touch screen, camera, bar code readers/scanners, RFID readers, and the like. Network interface 210 may take any of a number of forms, such as a network interface card, modem, wireless network card, embedded device, and the like. It will be appreciated that while information handling system 140 has been illustrated as a single computer or processor, information handling system 140 may be comprised of a group of computers or processors, according to an example embodiment of the disclosure.

Numerous other operating environments, system architectures, and device configurations are possible. Other system embodiments may include fewer or greater numbers of components and may incorporate some or all of the functionality described with respect to the system components shown in FIG. 2. For example, in one embodiment information handling system 140 may be implemented as a specialized processing machine that includes hardware and/or software for performing the methods described herein. In addition, the processor and/or processing capabilities of information handling system 140, or any portion or combination thereof. Accordingly, embodiments of the disclosure should not be construed as being limited to any particular operating environment, system architecture, or device configuration. Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time.

In some cases, the treatment data inputs according to one of the example embodiments may be displayed on a display associated with information handling system 140. In yet still other example embodiments, the information handling system 140 may forward gathered data to another system, such as another information handling system 140 at the operations center of an oilfield services provider, the operations center remote from the well location. From these treatment data input, hydraulic diagnostic data outputs may be determined.

Figure 3:
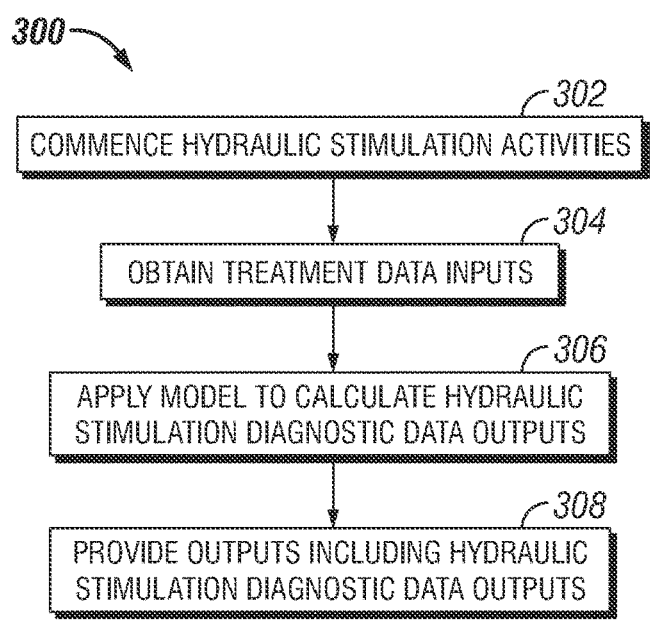
FIG. 3 illustrates a methodology of calculating pressure and energy for a hydraulic operation in accordance with one or more embodiments of the disclosure.

FIG. 3 illustrates a workflow 300 for determining hydraulic stimulation diagnostic data outputs according to one or more embodiments of the present disclosure. In FIG. 3, one or more steps of workflow 300 may be processed by information handling system 140 (e.g., referring to FIGS. 1 and 2) to determine and provide information concerning an ongoing or prior hydraulic stimulation operation. It should be noted that one or more steps of workflow 300 may be implemented by information handling system 140 as either software which may be disposed in memory 206. As illustrated in FIG. 3, workflow 300 begins with block 302, in which hydraulic stimulation activities may be commenced. In block 304, treatment data inputs may be obtained. In block 306, a model may be applied to calculate hydraulic stimulation diagnostic data outputs. In block 308, the hydraulic stimulation diagnostic data outputs from block 306 may be provided.

As noted, workflow 300 may be begin at block 302 wherein hydraulic stimulation activities may be commenced. By way of example, the hydraulic stimulation operation may be carried out at a well system 100 (e.g. referring to FIG. 1). As previously described, the hydraulic stimulation operation may include introduction of a fluid (fracturing fluid 102 on FIG. 1) into subterranean formation 120 (e.g., referring to FIG. 1).

In block 304, treatment data inputs may be obtained. Treatment data inputs may be collected by information handling system 140 from the well system 100. By way of example, information from instrumentation 132, fluid handling system 106, and other equipment in communication with the well system 100 are provided to information handling system 140. As previously described, treatment data inputs may include various data associated with the hydraulic stimulation operation, including, but not limited to, volumetric flow rate (e.g., of the fracturing fluid 102), fluid pressure at the wellhead, surface sand concentration, density (e.g., of the fracturing fluid 102).

Still referring to block 304, treatment data inputs including well system configuration information may be retrieved by information handling system 140 from data repository 202. Inputs from well system 100 may include rate of volumetric flow from hydraulic pumping equipment 112 in fluid handling system 106. Density inputs may be provided by densometer 134 and pressure inputs may be provided by transducer 136 (as shown in FIG. 1). Additional wellbore configuration inputs may include wellbore depth, depth of pumping area, depth of the perforations, hydraulic friction profiles, wellbore type, tubulars, and hydraulic fluid density, among others. Sampling rates for treatment information may vary, but can include, for example, one second data collection intervals. Drilling, casing, and perforation data may be obtained from various sources including but not limited to completion reports, drilling reports, public databases, and reference tables.

In block 306, a model may be applied to calculate hydraulic stimulation diagnostic data outputs. It will be appreciated that applying the model to perform the calculation may be done via information handling system 140. For example, after receiving all or a portion of the aforementioned treatment data inputs, the information handling system 140 may calculate hydraulic stimulation diagnostic data outputs. One or more models are applied to the treatment attribute data inputs to yield one hydraulic stimulation diagnostic data outputs. By making use of algorithms including use of equations of conservation of mass, energy, and volume, the hydraulic stimulation diagnostic data outputs may be determined. The hydraulic diagnostic data outputs include those previously described, such as discharge area, discharge velocity, net pressure energy, and discharge energy, among others. By assuming the downhole fracturing environment is a closed system, these equations of conservation of mass and energy may be solved from initial conditions to final conditions through the relationships of kinetic and potential energy of compressed fluids to obtain the hydraulic diagnostic data outputs.

In particular, in block 306 various models including the Law of conservation of mass, energy, and volume may be applied to treatment data inputs. By using these models, various relationships may be determined to provide the hydraulic stimulation diagnostic data outputs. For example, the exit velocity may be expressed as a function of volumetric rate and discharge area. The exit velocity may be expressed by the following continuity equation:

$$v_2 = \frac{A_1 v_1}{A_2} = \frac{\dot{V}}{A_2} \qquad (1)$$

wherein $v_1$=velocity of the fracturing fluid as it enters the wellbore exit; $v_2$=exit velocity of the fracturing fluid from the wellbore exit; $A_1$=cross sectional area in wellbore; $A_2$=discharge area=total area of all downhole exits; and $\dot{V}$=volumetric flow rate of the fracturing fluid.

Still referring to block 306, additional modelling operations on treatment data inputs to determine discharge area. For example, the discharge area may be expressed in terms of volumetric flow rate. The discharge area may be expressed in terms of volumetric flow rate by the following equation:

$$A_2 = \left(\frac{\dot{V}^2 \rho}{2(P_1 - P_i)}\right)^{\frac{1}{2}} \quad (2)$$

wherein $A_2$=discharge area; $\dot{V}$=volumetric flow rate of the fracturing fluid; $\rho$=density of the fracturing fluid; $P_1$=wellbore pressure at wellbore exit; and $P_i$=initial formation energy (i.e., initial formation pressure at wellbore exit).

Further determinations may be made in block 306. For example, the discharge energy may be determined. As previously describe, the discharge energy is the pressure of the fluid as it exits the wellbore. The discharge energy may be determined once equations (1) and (2) have been used to solve for discharge area and exit velocity. The discharge energy may be expressed by the following Bernoulli equation simplified by assuming no change in potential energy and solving for $P_2$:

$$P_2 = P_1 + \rho \frac{v_1^2}{2} - \rho \frac{v_2^2}{2} \quad (3)$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=exit velocity.

With further regard to block 305, net pressure energy may also be determined. As previously describe net pressure energy is the differential of the discharge energy and the initial energy in downhole environment. The net pressure energy may be expressed by the following equation:

$$\text{Net Pressure Energy} = P_2 - P_i \quad (4)$$

wherein $P_i$=initial formation energy; $P_2$=discharge energy.

The following derivations and accompanying equations (5) to (25) are provided to illustrate how the relationships to determine hydraulic stimulation diagnostic data outputs may be determined using equations of conservation of mass and energy. As illustrated, the equations of conservation of mass and energy may be used with an assumption that the downhole environment is a closed system.

The derivation may use the rule of conservation of mass. To illustrate, the rule of conservation of mass, the following continuity equations are provided:

$$A_1 v_1 \rho_1 = A v \rho = A_2 v_2 \rho_2 \quad (5)$$

$$\dot{m} = \dot{V} \rho \quad (6)$$

wherein A=area; v=velocity; $\rho$=density; $A_1$=cross sectional area in wellbore; $v_1$=velocity of the fracturing fluid as it enters the wellbore exit; $\rho_1$=density of the fracturing fluid as it enters the wellbore exit; $A_2$=discharge area; v2=exit velocity (velocity of fracturing fluid as it exits the wellbore); $\rho_2$=density of the fracturing fluid as it enters the wellbore exit; $\dot{m}$=mass rate, $\dot{V}$=volumetric flow rate. The above equation illustrates the assumption that the downhole environment is a closed system with mass conserved exiting the wellbore.

The derivation may also use the volumetric rate equation, which can be expressed by the following equation:

$$\dot{V} = A v \quad (7)$$

Wherein $\dot{V}$=volumetric flow rate; A=area; and v=velocity.

The derivation may also use the rule of conservation of energy. The rule of conservation of energy may be expressed by Bernoulli's equation as follows:

$$\frac{P_1}{\rho} + g z_1 + \frac{v_1^2}{2} = \frac{P}{\rho} + g z + \frac{v^2}{2} = \frac{P_2}{\rho} + g z_2 + \frac{v_2^2}{2} \quad (8)$$

wherein $\rho$=density of the fracturing fluid, g=gravitational force, P=pressure of the fracturing fluid, z=datum height, v=velocity of the fracturing fluid, $P_1$=wellbore pressure at wellbore exit; $z_1$=height in wellbore at wellbore exit; $v_1$=velocity of the fracturing fluid as it enters the wellbore exit; $P_2$=discharge energy; $z_2$=height in formation at wellbore exit; and $v_2$=exit velocity. In Equation (8), the pressure energy per unit mass is equal to the quotient of pressure divided by density. The potential energy per unit mass is equal to the product of the gravitation force times the datum height. The kinetic energy per unit mass is equal to the quotient of velocity squared divided by 2. The above equation illustrates the assumption that the downhole fracturing environment is a closed system with energy conserved exiting the wellbore.

The derivation may begin with rule of conservation of energy as expressed by equation (8). In the fracturing environment, it can be assumed that the height in the wellbore at the wellbore exit ($z_1$) is equal to the height in the formation at the wellbore exit ($z_2$).

From this, equation (8) may be streamlined whereby equation (8) may not be expressed as follows:

$$\frac{P_1}{\rho} + \frac{v_1^2}{2} = \frac{P_2}{\rho} + \frac{v_2^2}{2} \quad (9)$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=exit velocity.

To solve for the exit velocity (v2), equation (10) may then be rearranged as follows:

$$\frac{P_1}{\rho} + \frac{P_2}{\rho} + \frac{v_1^2}{2} = \frac{v_2^2}{2} \quad (10)$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=exit velocity.

Taking into account the understanding that the density of the fracturing fluid inside the wellbore and the density of the fracturing fluid in the formation outside the wellbore are equal as the fluid is being discharged, equation (10) may be rearranged as follows:

$$P_1 - P_2 + \rho \frac{v_1^2}{2} = \rho \frac{v_2^2}{2} \quad (11)$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=exit velocity. According to some embodiments, $v_1$ and $P_1$ are calculated.

As equation (11) is stated, there are two unknown variables, namely discharge energy ($P_2$) and exit velocity ($v_2$). To solve the equation, assumptions for discharge energy ($P_2$) and exit velocity ($v_2$) may be made based on the relationship between kinetic and potential energy. According to some embodiments a system including a stimulation volume may operate substantially as a closed system. Such closed system gains volume over time and accumulates stored energy. At any single point in time, the compressed fluid volume is equal to the product of the volumetric rate multiplied by the compressibility ratio multiplied by the pressure. This may be also expressed as follows:

$$\Delta V = \dot{V}cP \quad (12)$$

wherein $\Delta V$=compressed volume of the fracturing fluid; $\dot{V}$=fracturing fluid volume; c=compressibility ratio of the fracturing fluid; and P=pressure energy of the fracturing fluid. According to some embodiments, $\dot{V}$ indicates the volume in a wellbore at a specific time and $\Delta V$ represents the total pumped volume introduced into a wellbore.

Figure 4:
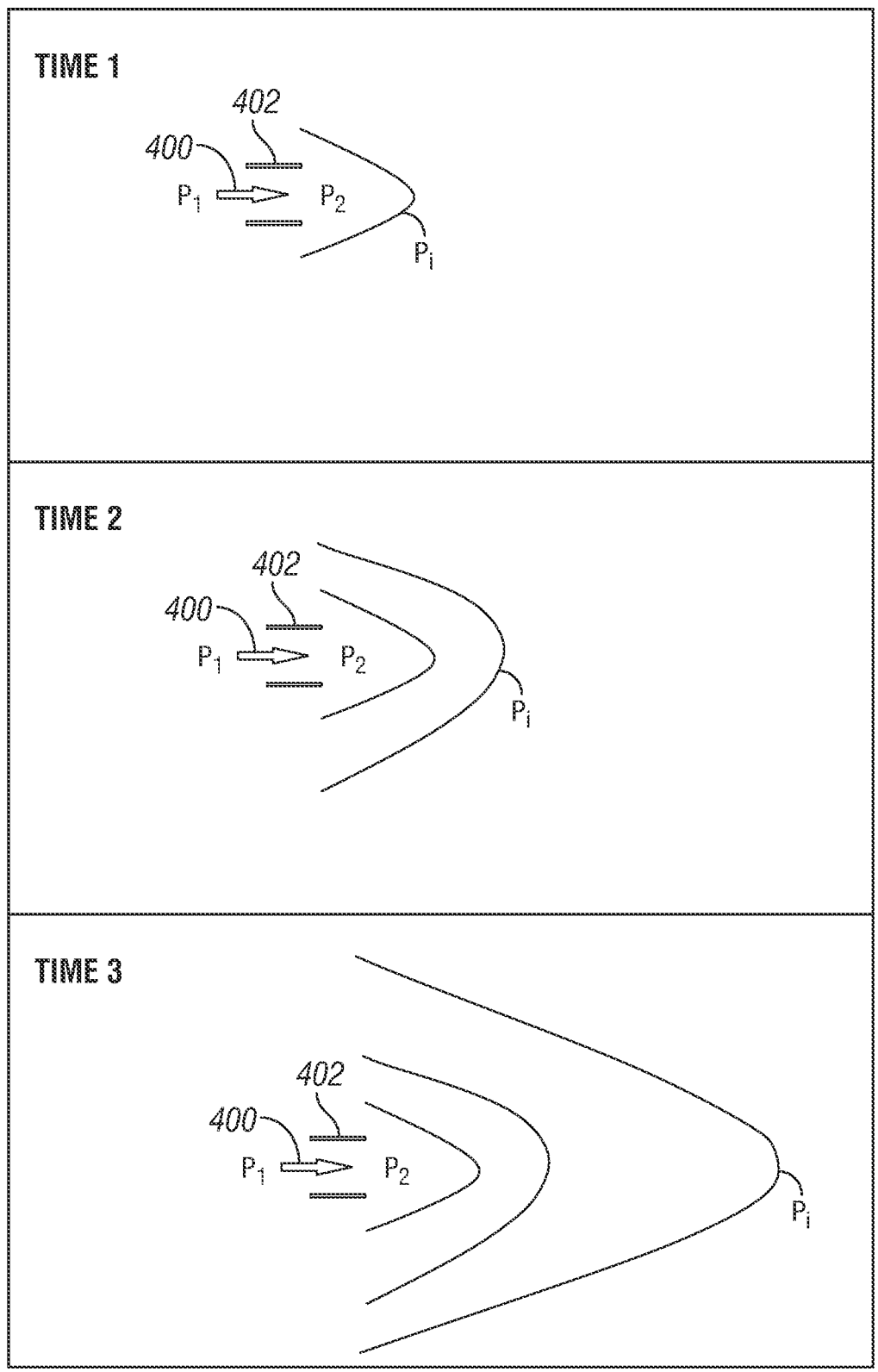
FIG. 4 illustrates a progression of pressure ($P_i$) location with time for a hydraulic stimulation operation according to an embodiment of the present disclosure.

Over time as the injected volume of the fracturing fluid increases, there is an increase in pressure relative to the initial formation energy (initial pressure of the formation prior to fracturing). FIG. 4 illustrates the progression the location of the initial formation energy (Pi) over time. As shown on FIG. 4, fracturing fluid (shown as arrow 400) passed through wellbore exit 402. The fracturing fluid has a pressure ($P_1$) in the wellbore at the wellbore exit 402, and a $P_2$=discharge energy. Additionally shown is the initial formation energy (Pi). The initial formation energy (Pi) is determined at static conditions before stimulation is determined at static conditions before stimulation is initiated. As shown from time 1 to time 3, the location of the initial formation energy (Pi) progresses with the increase in volume of the fracturing fluid injected into the formation. Between two periods of time, this can be expressed as follows:

$$\frac{\Delta V}{\dot{V}c} = P_2 - P_i \quad (13)$$

wherein $\Delta V$=compressed volume of the fracturing fluid; $\dot{V}$=fracturing fluid volume; c=compressibility ratio of the fracturing fluid; c=compressibility ratio; $P_2$=discharge energy; and $P_i$=initial formation energy.

This potential energy shown in equation (13) may be expressed as kinetic energy by the following relationship:

$$\rho\frac{v_1^2}{2} = \frac{\Delta V}{\dot{V}c} \quad (14)$$

wherein $\rho$=density of the fracturing fluid; $v_1$=velocity of the fracturing fluid as it enters the wellbore exit; $\Delta V$=compressed volume of the fracturing fluid; $\dot{V}$=fracturing fluid volume; and c=compressibility ratio of the fracturing fluid;

Equation (14) may further be expressed in the term of pressure energy as follows:

$$\frac{\Delta V}{\dot{V}c} + \rho\frac{v_1^2}{2} = \frac{\Delta V}{\dot{V}c} + P_2 - P_i \quad (15)$$

wherein $\Delta V$=compressed volume of the fracturing fluid; $\dot{V}$=fracturing fluid volume; c=compressibility ratio of the fracturing fluid; $\rho$=density of the fracturing fluid; $v_1$=velocity of the fracturing fluid as it enters the wellbore exit; $P_2$=discharge energy; and $P_i$=initial formation energy.

Equation (15) may be further reduced as follows by collection of like terms:

$$\rho\frac{v_1^2}{2} = P_2 - P_i \quad (16)$$

wherein $\rho$=density of the fracturing fluid; $v_1$=velocity of the fracturing fluid as it enters the wellbore exit; $P_2$=discharge energy; and $P_i$=initial formation energy.

Equation 16 may be solved for discharge energy ($P_2$) as follows:

$$P_2 = \rho\frac{v_1^2}{2} + P_i \quad (17)$$

wherein $\rho$=density of the fracturing fluid; $v_1$=velocity of the fracturing fluid as it enters the wellbore exit; $P_2$=discharge energy; and $P_i$=initial formation energy.

The resulting equation (17) for discharge energy ($P_2$) may be substituted for discharge energy ($P_2$) in the reduced version of equation (11) as follows:

$$P_1 - P_2 + \rho\frac{v_1^2}{2} = \rho\frac{v_2^2}{2} \xrightarrow{\text{yields}} P_1 - \left(\rho\frac{v_1^2}{2} + P_i\right) + \rho\frac{v_1^2}{2} = \rho\frac{v_2^2}{2} \quad (18)$$

wherein $\rho$=density of the fracturing fluid; $v_1$=velocity of the fracturing fluid as it enters the wellbore exit; $v_2$=exit velocity; $P_1$=wellbore pressure at wellbore exit; $P_2$=discharge energy; and $P_i$=initial formation energy.

The resulting equation (18) may be further reduced by collection of like terms to result in the following equation:

$$P_1 - P_i = \rho\frac{v_2^2}{2} \quad (19)$$

wherein $\rho$=density of the fracturing fluid; $v_2$=exit velocity; $P_1$=wellbore pressure at wellbore exit; and $P_i$=initial formation energy.

The rules of conversation of mass may now be used to define the velocity of the fracturing fluid as it enters the wellbore exit ($v_1$) in terms of exit velocity ($v_2$). In particular, by solving equation (5) above for exit velocity ($v_2$), the following equation may be obtained:

$$\frac{A_1 v_1}{A_2} = v_2 \quad (20)$$

wherein $A_1$=cross sectional area in wellbore; $v_1$=velocity of the fracturing fluid as it enters the wellbore exit; $A_2$=discharge area; and $v_2$=exit velocity (velocity of fracturing fluid as it exits the wellbore).

In addition, equation (19) may be rearranged to solve for exit velocity ($v_2$) as follows:

$$\frac{2(P_1 - P_i)}{\rho} = v_2^2 \quad (21)$$

wherein $\rho$=density of the fracturing fluid; $v_2$=exit velocity; $P_1$=wellbore pressure at wellbore exit; and $P_i$=initial formation energy.

Further substitution of the relationship of exit velocity ($v_2$) in terms of velocity of the fracturing fluid ($v_1$) from equation (20) into equation (21) results in the following equation:

$$\frac{2(P_1 - P_i)}{\rho} = \left(\frac{A_1 v_1}{A_2}\right)^2 \quad (22)$$

wherein $\rho$=density of the fracturing fluid; $P_1$=wellbore pressure at wellbore exit; $P_i$=initial formation energy; $A_1$=cross sectional area in wellbore; $v_1$=velocity of the fracturing fluid as it enters the wellbore exit; and $A_2$=discharge area.

Rearranging equation (22) to solve for discharge area $A_2$, results in the following equation:

$$A_2^2 = \frac{(A_1 v_1)^2 \rho}{2(P_1 - P_i)} \xrightarrow{\text{yields}} A_2 = \left(\frac{(A_1 v_1)^2 \rho}{2(P_1 - P_i)}\right)^{\frac{1}{2}} \quad (23)$$

wherein $\rho$=density of the fracturing fluid; $P_1$=wellbore pressure at wellbore exit; $P_i$=initial formation energy; $A_1$=cross sectional area in wellbore; $v_1$=velocity of the fracturing fluid as it enters the wellbore exit; and $A_2$=discharge area.

Equation (23) may be further simplified by application of the continuity equation. In particular, the rule of conservation of volume from equation (7) may be rearranged to yield the previously expressed equation (1) for exit velocity ($v_2$) as follows:

$$v_2 = \frac{A_1 v_1}{A_2} = \frac{\dot{V}}{A_2} \quad (1)$$

wherein $v_1$=velocity of the fracturing fluid as it enters the wellbore exit; $v_2$=exit velocity of the fracturing fluid from the wellbore exit; $A_1$=cross sectional area in wellbore; $A_2$=discharge area=total area of all downhole exits; and $\dot{V}$=volumetric flow rate of the fracturing fluid.

The discharge area may now be expressed in terms of volumetric rate ($\dot{V}$) of the fracturing fluid. For example, the volume rate ($\dot{V}$) may be substituted into equation (23) to yield the previously expressed equation (2) for exit velocity ($v_2$) as follows:

$$A_2 = \left(\frac{\dot{V}^2 \rho}{2(P_1 - P_i)}\right)^{\frac{1}{2}} \quad (2)$$

wherein $A_2$=discharge area; $\dot{V}$=volumetric flow rate of the fracturing fluid; $\rho$=density of the fracturing fluid; $P_1$=wellbore pressure at wellbore exit; and $P_i$=initial formation energy (i.e., initial formation pressure at wellbore exit).

Once discharge area ($A_2$) and exit velocity ($v_2$) have been determined, the discharge energy ($P_2$) may be determined. The discharge energy ($P_2$) may be determined by the previously expressed equation (3) as follows:

$$P_2 = P_1 + \rho \frac{v_1^2}{2} - \rho \frac{v_2^2}{2} \quad (3)$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=exit velocity.

With $P_2$ and $P_1$ known, the previously presented equation (4) for net pressure energy may be determined to yield net pressure energy as follows:

$$\text{Net Pressure Energy} = P_2 - P_i \quad (4)$$

wherein $P_i$=wellbore pressure at wellbore exit; $P_2$=discharge energy.

Referring back to FIG. 3, the hydraulic stimulation diagnostic data outputs from block 306 may be provided in block 308. Providing the hydraulic stimulation diagnostic data outputs may include, for example, displaying and/or communicated to an operator in real-time or after the fact. Hydraulic stimulation diagnostic data outputs provide information concerning energy based net pressure and corresponding discharge area as an indication of energy use during current or past fracturing operations. By way of example, net pressure energy and discharge area may be provided. Examples of block 308 hydraulic stimulation diagnostic data outputs are shown with respect to FIGS. 5-10. With the hydraulic stimulation diagnostic data, an operator may determine, for example, one or more modifications to the hydraulic stimulation. For example, the operation may adjust one or more of pumping pressure and/or density of the fracturing fluid. Density may be adjusted, for example, by adjusting proppant concentration in the fracturing fluid.

Figure 5:
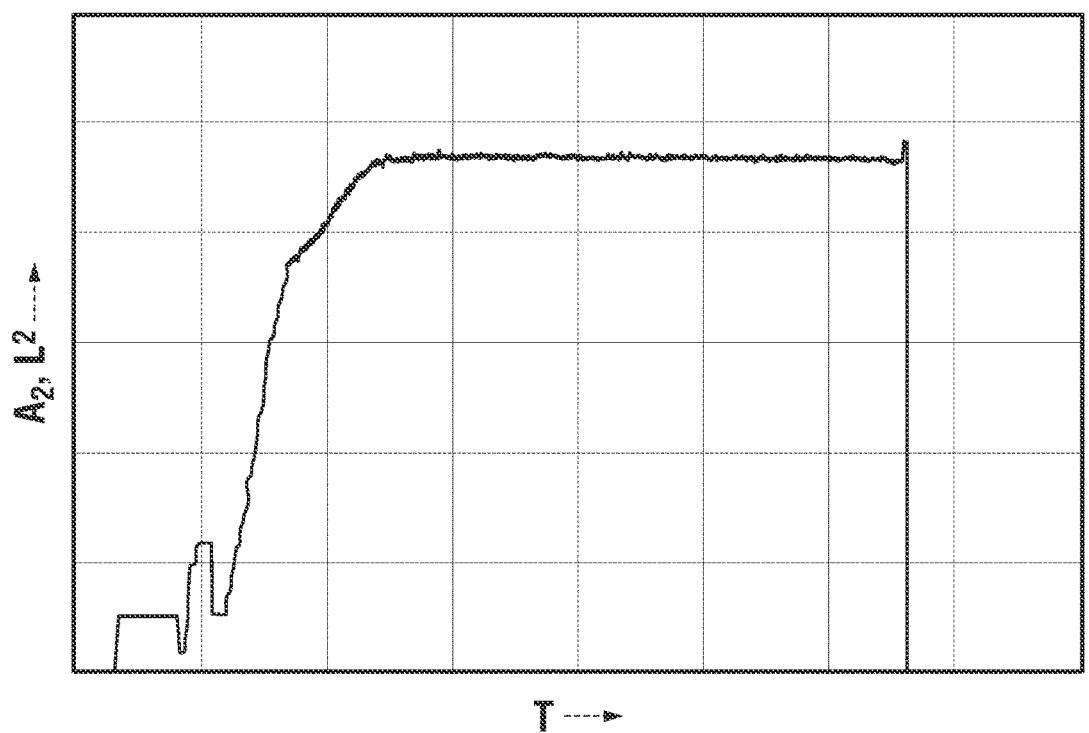
FIG. 5 illustrates a plot of discharge area versus time for a hydraulic stimulation operation in according to an embodiment of the present disclosure.

FIG. 5 illustrates a plot of discharge area versus time for a hydraulic stimulation operation according to an embodiment of the present disclosure. In FIG. 5, discharge area is plotted based on measured data as a function of time. Discharge area may be calculated as described above, including use of equation (2). With respect to equation (2), discharge area may be expressed in terms of volumetric rate ($\dot{V}$). As illustrated, over time, the discharge area may increase for a given volumetric flow rate.

Figure 6:
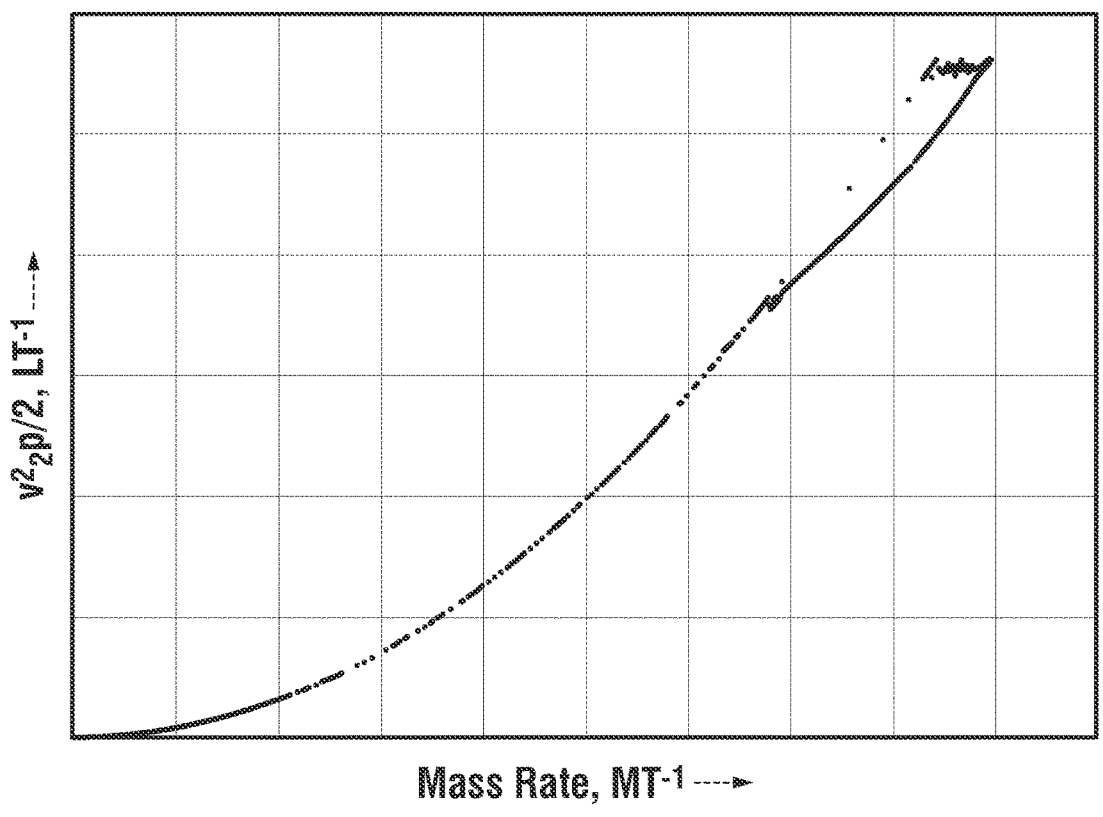
FIG. 6 illustrates a plot of discharge energy versus mass flow rate for a hydraulic stimulation operation in according to an embodiment of the present disclosure.

FIG. 6 illustrates a plot of discharge energy versus time for a hydraulic stimulation operation in according to an embodiment of the present disclosure. In FIG. 6, the discharge energy plotted versus mass rate. Discharge energy may be described in terms of pressure and calculated as described above, including use of equation (3). As illustrated, the discharge energy may increase over time as the mass rate increases.

Figure 7:
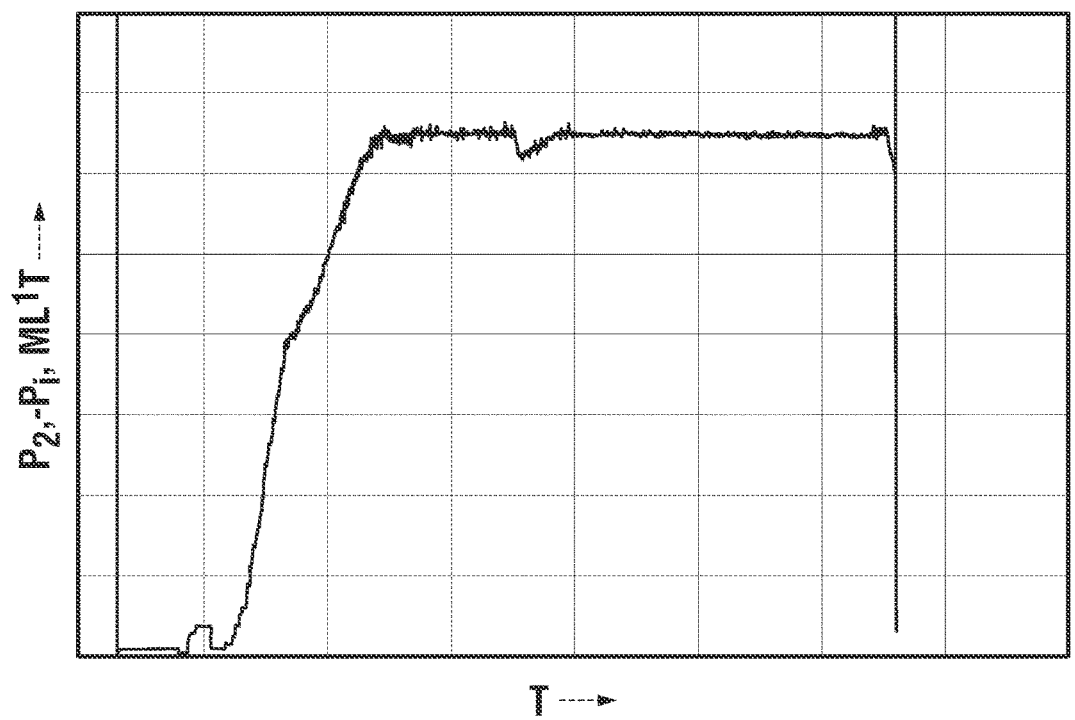
FIG. 7 illustrates a plot of net pressure energy versus time for a hydraulic stimulation operation in according to an embodiment of the present disclosure.

FIG. 7 illustrates a plot of net pressure energy versus time for a hydraulic stimulation operation in according to an embodiment of the present disclosure. In FIG. 7, net pressure energy is plotted as a function of time. Net pressure energy may be calculated as described above, including use of equation (4) As illustrated, the net pressure energy may increase sharply after an initial period of time and then may substantially plateaus.

Figure 8:
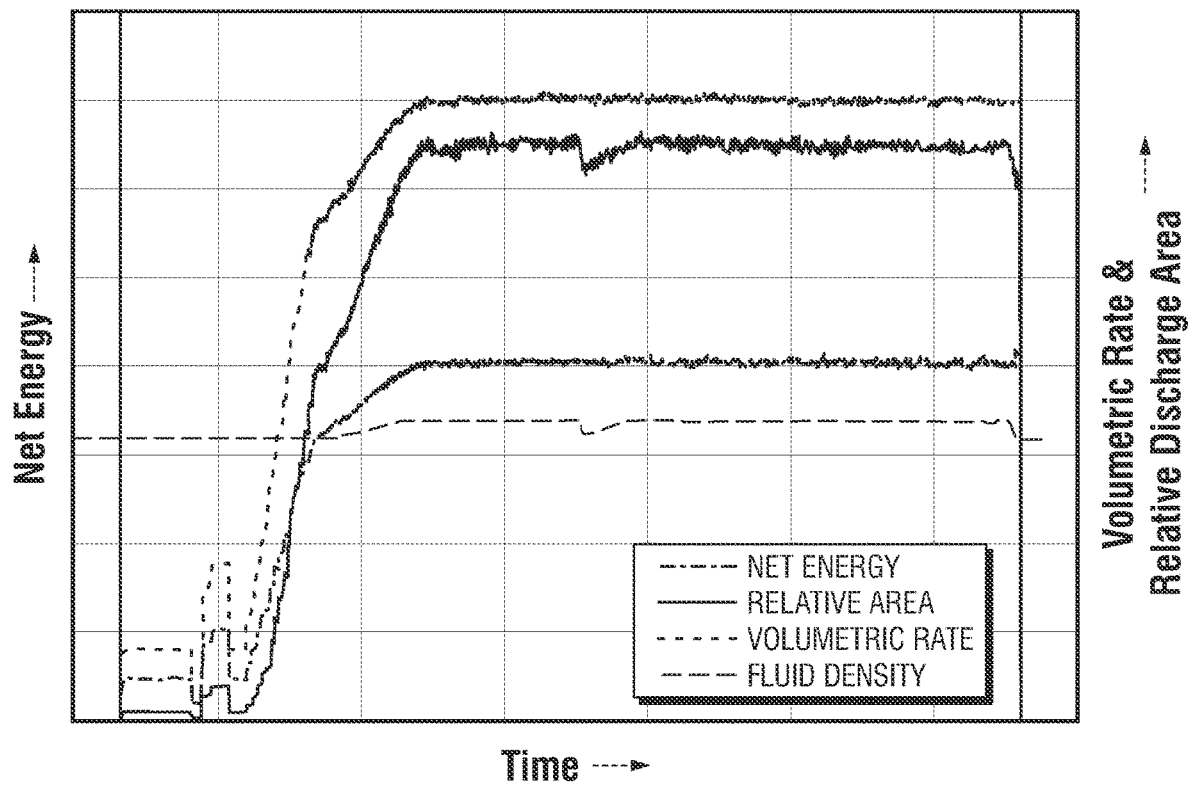
FIG. 8 illustrates a plot of net energy, relative area, volumetric rate, and fluid density versus time for a hydraulic stimulation operation in according to an embodiment of the present disclosure.

FIG. 8 illustrates a plot of net pressure energy, relative area as a percent of discharge efficiency, volumetric rate, and fluid density for a hydraulic stimulation operation in according to an embodiment of the present disclosure. In FIG. 8 net pressure energy, relative area, volumetric rate, and fluid density are plotted as a function of time. Net energy may be calculated as described above, including use of equation (4). Relative area may be calculated as described above, including use of equations (2). Volumetric rate may be calculated. Fluid density may be measured or calculated using any suitable technique, including by densometer 134 as shown in FIG. 1. As illustrated, density may be constant over time, while following an initial period of time, net pressure energy, volumetric rate, and relative area may increase sharply before substantially plateauing.

In at least one embodiment, discharge efficiency may be determined as a further output. The discharged area determined as described herein may be used to estimate a percent discharge efficiency relative to a physical limit. The physically available discharge area may be the area that is physically created for discharging fluid from inside the injection path (e.g., wellbore) into the surrounding environment (e.g., formation). However, the entire physically available discharge area may not accept the fluid so that the actual discharge area is less than the physically available discharge area. Accordingly, the discharge efficiency may be determined as follows:

$$\% \text{ Discharge Efficiency} = 100\left(\frac{A_2}{A_P}\right) \quad (24)$$

wherein $A_2$=discharge area and $A_P$=physically available discharge area.

In addition, the number of discharge points may also be determined as an output for multiple and separate discrete discharge points. For example, the number of discharge points may be estimated as follows:

$$\text{Number of Discharge Points} = \left(\frac{A_2}{A_D}\right) \quad (25)$$

wherein $A_2$=discharge area and $A_D$=discrete discharge area of a discrete discharge point. It will be appreciated that the size of the discrete discharge point may be determined by perforation design, type of charge, diameter, number of shots, slots, or other downhole exits through which the fracturing fluid exits a wellbore into a subterranean formation.

Figure 9:
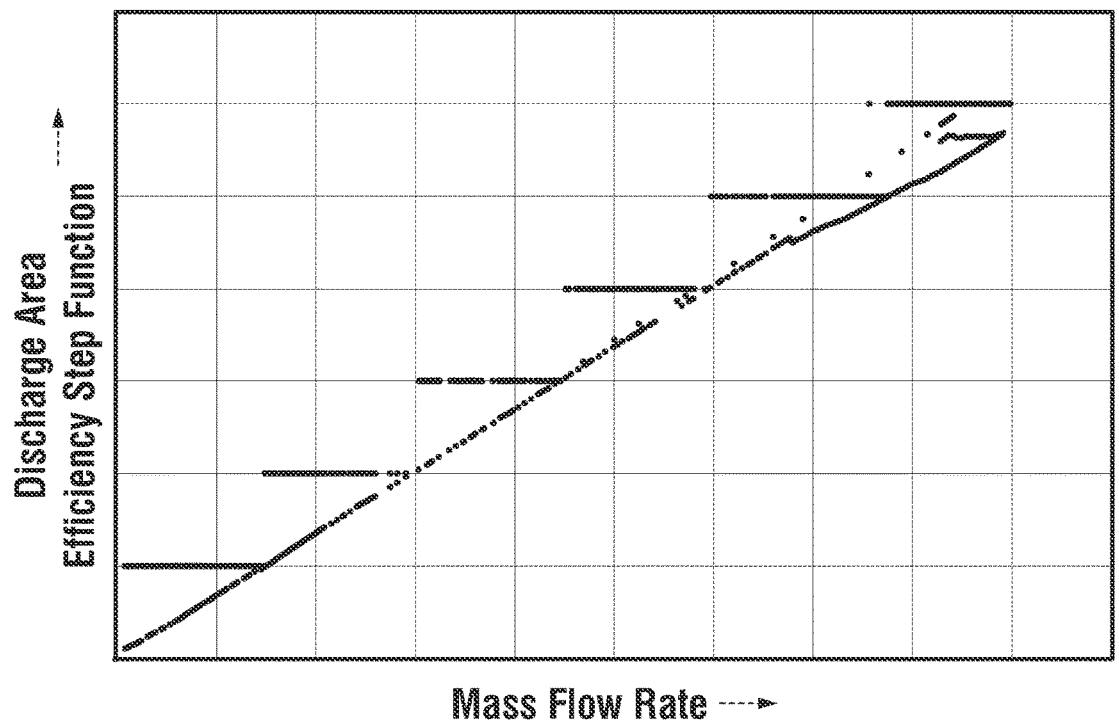
FIG. 9 illustrates a plot of discharge area efficiency and number of discharge points versus mass flow rate for a hydraulic stimulation operation in according to an embodiment of the present disclosure.

FIG. 9 illustrates a plot of discharge area efficiency and number of discharge points versus mass flow rate for a hydraulic stimulation operation in according to an embodiment of the present disclosure. In FIG. 9, the discharge area efficiency and number of discharge points are shown as a function of mass flow rate. Discharge area efficiency may be determined as described above, including use of equation (24). The number of discharge points may be determined as described above, including use of equation (25). Mass flow rate may be calculated based off measured values. As illustrated, discharge area increases in a stairstep fashion over time.

Figure 10:
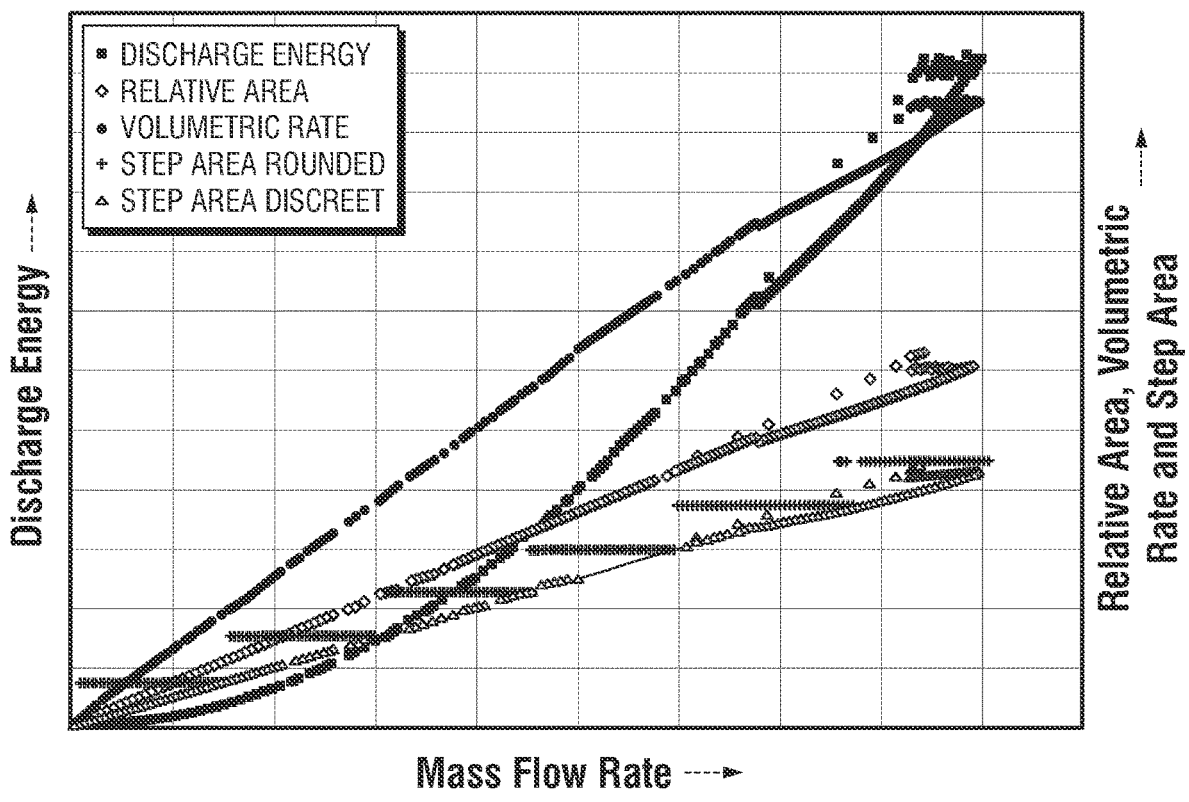
FIG. 10 illustrates a plot of discharge energy, discharge area efficiency, volumetric rate, number of discharge points, and rounded number of discharge points for a hydraulic stimulation operation in according to an embodiment of the present disclosure.

FIG. 10 illustrates a combination plot of discharge energy, discharge area efficiency, volumetric rate, number of discharge points, and rounded number of discharge points for a hydraulic stimulation operation in according to an embodiment of the present disclosure. FIG. 10 shows discharge energy, discharge area efficiency, volumetric rate, number of discharge points, and rounded number of discharge points as a function of mass flow rate. Discharge energy may be calculated as described above, including use of equations 16 and 18. Discharge area efficiency may be determined as described above, including use of equations 5 and 19. Volumetric rate may be determined as described above, including use of equation 12. The number of discharge points may be determined as described above with respect to FIG. 9. Mass flow rate may be determined as described herein. As illustrated, the plotted values on this combination plot echo the trends illustrated in FIGS. 5-9 in that the discharge energy, relative area, volumetric rate, and rounded step area generally increase over a given mass flow rate over time.

The preceding description provides various examples of the systems and methods of use disclosed herein which may contain different method steps and alternative combinations of components. Among other things, the proceeding description provides hydraulic stimulation methods including techniques for pressure and energy analysis.

Statement 1. A method for determining discharge area in hydraulic stimulation operations may comprise obtaining one or more treatment data inputs from a well system, and determining a discharge area by applying the one or more treatment data inputs to a function that determines discharge area in terms of volumetric flow rate of the fracturing fluid, wherein the discharge area is a total area of all downhole exits through which the fracturing fluid exits a wellbore into a subterranean formation.

Statement 2. The method of statement 1, wherein determining the discharge area comprises solving equation (2), as set forth above.

Statement 3. The method of statement 1 or statement 2, further comprising determining a discharge energy based at least on the discharge area and an exit velocity.

Statement 4. The method of statement 3, wherein the exit velocity is determined by application of the discharge area to equation (1), as set forth above.

Statement 5. The method of statement 3, wherein the discharge energy is determined by application of the discharge area and the exit velocity to equation (3), as set forth above.

Statement 6. The method of statement 5, further comprising determining a net pressure energy by subtraction of an initial formation energy from the discharge energy.

Statement 7. The method of statement 6, further comprising adjusting one or more parameters of a hydraulic stimulation operation in response to at least one of the discharge area, the exit velocity, or the net pressure energy.

Statement 8. The method of any preceding statement, wherein determining the discharge area assumes a downhole fracturing environment is a close system and uses equations of conversation of mass and energy.

Statement 9. The method of any preceding statement, further comprising determining a discharge efficiency based at least partially on the discharge area and a physically available discharge area.

Statement 10. The method of any preceding statement, further comprising determining a number of discharge points based at least partially on the discharge area and a discrete discharge area.

Statement 11. The method of any preceding statement, wherein obtaining the one or more treatment data inputs from a well system comprises obtaining the one or more treatment data inputs from instrumentation at the well system.

Statement 12. The method of any preceding statement, wherein obtaining the one or more treatment data inputs comprises retrieving the wellbore configuration information from a data repository.

Statement 13. The method of statement 12, wherein wellbore configuration information comprises one or more of casing diameter, inner pipe diameter, and depth of one of more wellbore perforations.

Statement 14. A method of determining net pressure energy and discharge area in hydraulic stimulation operations may comprise commencing the hydraulic stimulation operations to create one or more fractures in a subterranean formation, obtaining one or more treatment data inputs from one or more instruments at a well system, retrieving wellbore configuration information, determining one or more hydraulic stimulation diagnostic data outputs for a hydraulic stimulation operation based on the wellbore configuration information and the one or more treatment data inputs, wherein the one or more hydraulic stimulation data outputs comprises a discharge area determined in terms of volumetric flow rate, wherein the discharge area is a total area of all downhole exits through which the fracturing fluid exits a wellbore into a subterranean formation, determining a discharge efficiency based at least partially on the discharge area and a physically available discharge area, and storing the discharge area and the discharge efficiency on one or more tangible, non-volatile computer-readable media thereby creating a discharge efficiency product.

Statement 15. The method of statement 14, wherein the step of retrieving wellbore configuration information comprises retrieving the wellbore configuration information from a data repository.

Statement 16. The method of statement 14 or statement 15, wherein wellbore configuration information comprises one or more of casing diameter, inner pipe diameter, and depth of one of more fluid outlets.

Statement 17. The method of any one of statements 14 to 16, further comprising: determining a discharge energy based at least on the discharge area and an exit velocity; and determining a net pressure energy by subtracting an initial formation energy from the discharge energy, and wherein determining one or more hydraulic stimulation diagnostic data outputs and determining a wellbore fracturing energy efficiency parameter are done in real-time during the hydraulic stimulation operations.

Statement 18. A system for use in hydraulic stimulation operations may comprise an information handling system that may comprise at least one memory operable to store computer-executable instructions, at least one communications interface to access the at least one memory and at least one processor configured to access the at least one memory via the at least one communications interface and execute the computer-executable instructions to: obtain one or more treatment data inputs from a well system, and determine a discharge area by applying the one or more treatment data inputs to a function that determines discharge area in terms of volumetric flow rate of the fracturing fluid, wherein the discharge area is a total area of all downhole exits through which the fracturing fluid exits a wellbore into a subterranean formation, determine a discharge energy based at least on the discharge area and an exit velocity, and determine a net pressure energy by subtraction of an initial formation energy from the discharge energy.

Statement 19. The system of statement 14, wherein the determine the discharge area comprises a computer-executable instruction to solve equation (2), as set forth above, wherein the exit velocity is determined by a computer-executable instruction to solve equation (1), as set forth above, and wherein the discharge energy is determined by a computer-executable instruction to solve equation (3), as set forth above.

Statement 20. The system of statement 18 or statement 19, further comprising the at least one processor further configured to access the at least one memory via the at least one communications interface and execute the computer-executable instructions to determine a discharge efficiency based at least partially on the discharge area and a physically available discharge area.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces. The term "coupled" means directly or indirectly connected.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of determining net pressure energy and discharge area in hydraulic stimulation operations comprising:
   commencing the hydraulic stimulation operations to create one or more fractures in a subterranean formation;
   obtaining one or more treatment data inputs from one or more instruments at a well system;
   retrieving wellbore configuration information;
   determining one or more hydraulic stimulation diagnostic data outputs for a hydraulic stimulation operation based on the wellbore configuration information and the one or more treatment data inputs, wherein the one or more hydraulic stimulation diagnostic data outputs comprises a discharge area determined in terms of volumetric flow rate of a fracturing fluid, wherein the discharge area is a total area of all downhole exits through which the fracturing fluid exits a wellbore into the subterranean formation;
   determining a discharge efficiency based at least partially on the discharge area and a physically available discharge area; and
   storing the discharge area and the discharge efficiency on one or more tangible, non-volatile computer-readable media thereby creating a discharge efficiency product.

2. The method of claim 1, wherein the step of retrieving wellbore configuration information comprises retrieving the wellbore configuration information from a data repository.

3. The method of claim 1, wherein wellbore configuration information comprises one or more of casing diameter, inner pipe diameter, and depth of one or more fluid outlets.

4. The method of claim 1, wherein the one or more treatment data inputs comprises one or more of a volumetric flow rate, a density, or a pressure.

5. The method of claim 1, wherein determining the discharge area comprises solving the following equation:

$$A_2 = \left(\frac{\dot{V}^2 \rho}{2(P_1 - P_i)}\right)^{\frac{1}{2}}$$

wherein $A_2$=the discharge area; $\dot{V}$=the volumetric flow rate of the fracturing fluid; $\rho$=density of the fracturing fluid; $P_1$=wellbore pressure at wellbore exit; and $P_i$=initial formation energy.

6. The method of claim 1, further comprising determining a discharge energy based at least on the discharge area and an exit velocity.

7. The method of claim 6, wherein the exit velocity is determined by application of the discharge area to the following equation:

$$v_2 = \frac{\dot{V}}{A_2}$$

wherein $v_2$=exit velocity of the fracturing fluid from the wellbore exit; $A_2$=discharge area; and $\dot{V}$=volumetric flow rate of the fracturing fluid.

8. The method of claim 6, wherein the discharge energy is determined by application of the discharge area and the exit velocity to the following equation:

$$P_2 = P_1 + \rho\frac{v_1^2}{2} - \rho\frac{v_2^2}{2}$$

wherein $P_1$=wellbore pressure at wellbore exit; $P_2$=discharge energy; $\rho$=density of the fracturing fluid; $v_1$=velocity of the fracturing fluid as it enters the wellbore exit; and $v_2$=the exit velocity.

9. The method of claim 8, further comprising determining a net pressure energy by subtraction of an initial formation energy from the discharge energy.

10. The method of claim 9, further comprising adjusting one or more parameters of a hydraulic stimulation operation in response to at least one of the discharge area, the exit velocity, or the net pressure energy.

11. The method of claim 9, wherein the net pressure energy is displayed on a display of an information handling system.

12. The method of claim 1, further comprising: determining a discharge energy based at least on the discharge area and an exit velocity; and determining a net pressure energy by subtracting an initial formation energy from the discharge energy; and
   wherein determining one or more hydraulic stimulation diagnostic data outputs and determining a wellbore fracturing energy efficiency parameter are done in real-time during the hydraulic stimulation operations.

13. The method of claim 12, wherein the one or more hydraulic stimulation diagnostic data outputs are displayed on a display of an information handling system.

14. The method of claim 13, further comprising adjusting one or more parameters of a hydraulic stimulation operation in response to at least one of the hydraulic stimulation diagnostic data outputs.

15. The method of claim 1, further comprising determining a number of discharge points based at least partially on the discharge area and a discrete discharge area.

16. The method of claim 1, wherein determining the discharge area assumes a downhole fracturing environment is a close system and uses equations of conversation of mass and energy.

17. A method of determining net pressure energy and discharge area in hydraulic stimulation operations comprising:
   commencing the hydraulic stimulation operations to create one or more fractures in a subterranean formation;
   obtaining one or more treatment data inputs from one or more instruments at a well system;
   retrieving wellbore configuration information from a data repository;
   determining one or more hydraulic stimulation diagnostic data outputs for a hydraulic stimulation operation based on the wellbore configuration information and the one or more treatment data inputs, wherein the one or more hydraulic stimulation diagnostic data outputs comprises a discharge area determined in terms of volumetric flow rate of a fracturing fluid, wherein the discharge area is a total area of all downhole exits through which the fracturing fluid exits a wellbore into the subterranean formation;

determining a discharge efficiency based at least partially on the discharge area and a physically available discharge area, wherein the physically available discharge area is greater than the discharge area; and storing the discharge area and the discharge efficiency on one or more tangible, non-volatile computer-readable media thereby creating a discharge efficiency product.

18. The method of claim 17, further comprising determining a net pressure energy by subtraction of an initial formation energy from a discharge energy, wherein the discharge energy is based at least on the discharge area and an exit velocity, and wherein the exit velocity is determined by application of the discharge area to the following equation:

$$v_2 = \frac{\dot{V}}{A_2}$$

wherein $v_2$=exit velocity of the fracturing fluid from the wellbore exit; $A_2$=discharge area; and $\dot{V}$=volumetric flow rate of the fracturing fluid.

19. The method of claim 18, wherein at least one of the net pressure energy, the discharge area, the discharge energy, the discharge efficiency, or a combination thereof are displayed on a display of an information handling system.

20. The method of claim 19, further comprising adjusting one or more parameters of a hydraulic stimulation operation in response to at least one of the net pressure energy, the discharge area, the discharge energy, the discharge efficiency, or a combination thereof.

* * * * *